United States Patent
Cory

(10) Patent No.: US 9,127,646 B2
(45) Date of Patent: Sep. 8, 2015

(54) TOROIDAL AUGMENTED WIND POWER GENERATION SYSTEM USING A MODIFIED AND INTEGRATED VERTICAL AXIS WIND TURBINE ROTOR AND GENERATOR ASSEMBLY

(75) Inventor: Kenneth D. Cory, Carrollton, TX (US)

(73) Assignee: V3 TECHNOLOGIES, LLC, Frisco, TX (US)

( * ) Notice: Subject to any disclaimer, the term of this patent is extended or adjusted under 35 U.S.C. 154(b) by 625 days.

(21) Appl. No.: 13/416,799

(22) Filed: Mar. 9, 2012

(65) Prior Publication Data

US 2013/0236306 A1    Sep. 12, 2013

(51) Int. Cl.

| F03D 3/02 | (2006.01) |
|---|---|
| *F03D 1/04* | (2006.01) |
| F03D 11/00 | (2006.01) |
| F03D 11/02 | (2006.01) |
| F03D 9/00 | (2006.01) |
| H02P 9/04 | (2006.01) |

(52) U.S. Cl.
CPC ............... F03D 1/04 (2013.01); *F05B 2240/40* (2013.01); *F05B 2240/912* (2013.01); *Y02E 10/728* (2013.01)

(58) Field of Classification Search
CPC ............. F03D 3/005; F03D 3/02; F03D 3/04; F03D 3/0409; F03D 3/0427; F03D 3/0436; F03D 3/0445; F03D 3/0454; F03D 3/0463; F03D 3/061; F03D 3/062; F03D 11/04; F05B 2240/211; F05B 2240/216; F05B 2240/40; F05B 2240/91; F05B 2240/912
USPC ........ 415/1, 2.1, 4.1, 4.2, 4.4, 60, 907; 416/9, 416/12, 120, 121, 124, 125, 132 B, 149, 416/170 R, 197 R, 197 A, 210 R, 243, DIG. 4, 416/DIG. 6

See application file for complete search history.

(56) References Cited

U.S. PATENT DOCUMENTS

| 2,017,961 | A | * | 10/1935 | Ferral .......................... 415/4.5 |
|---|---|---|---|---|
| 3,883,750 | A | | 5/1975 | Uzzell, Jr. |
| 4,079,264 | A | | 3/1978 | Cohen |

(Continued)

FOREIGN PATENT DOCUMENTS

| EP | 1406011 B1 | 4/2004 |
|---|---|---|
| WO | WO2008017106 A1 | 2/2008 |

OTHER PUBLICATIONS

C Gallo et al., Design and Dynamic Simulation of a Fixed Pitch 56 kW Wind Turbine Drive Train with a Continuously Variable Transmission, NASA, Mar. 1986.

*Primary Examiner* — Dwayne J White
*Assistant Examiner* — Alexander White
(74) *Attorney, Agent, or Firm* — Braxton, Hilton & Perrone, PLLC

(57) ABSTRACT

A wind power generating system in which a plurality of stationary modules form a toroidal shaped tower that accelerates wind passing around and between the modules due to the Bernoulli Effect. Between the modules are located a plurality of vertical axis wind turbine rotors with an integrated generator system that in combination forms an integrated rotor and generator assembly connected to a rotatable yaw platform via an improved support arm. The rotor and generator assemblies act independently of each other to accommodate different wind conditions at different altitudes and to provide partial production to significantly enhance overall wind production.

20 Claims, 11 Drawing Sheets

(56) References Cited

U.S. PATENT DOCUMENTS

| | | |
|---|---|---|
| 4,156,579 A | 5/1979 | Weisbrich |
| 4,288,199 A | 9/1981 | Weisbrich |
| 4,332,518 A | 6/1982 | Weisbrich |
| 4,540,333 A | 9/1985 | Weisbrich |
| 4,808,074 A * | 2/1989 | South ............................ 416/140 |
| 5,062,765 A | 11/1991 | McConachy |
| 5,146,096 A | 9/1992 | McConachy |
| 5,182,458 A | 1/1993 | McConachy |
| 5,520,505 A | 5/1996 | Weisbrich |
| 6,616,402 B2 | 9/2003 | Selsam |
| 6,856,040 B2 | 2/2005 | Feddersen et al. |
| 6,933,625 B2 | 8/2005 | Feddersen et al. |
| 7,011,498 B2 | 3/2006 | Vos et al. |
| 7,015,595 B2 | 3/2006 | Feddersen et al. |
| 7,115,066 B1 | 10/2006 | Lee |
| 7,484,363 B2 | 2/2009 | Reidy et al. |
| 7,679,207 B2 | 3/2010 | Cory |
| 7,679,209 B2 | 3/2010 | Rashidi |
| 7,948,101 B2 * | 5/2011 | Burtch ............................ 290/44 |
| 2002/0091036 A1 | 7/2002 | Bott et al. |
| 2002/0131864 A1 | 9/2002 | Vos et al. |
| 2004/0247437 A1 | 12/2004 | Otaki et al. |
| 2005/0118021 A2 | 6/2005 | Vos et al. |
| 2006/0112688 A1 | 6/2006 | Vos et al. |
| 2006/0205553 A1 | 9/2006 | Lee |
| 2008/0284171 A1 | 11/2008 | Cory |
| 2009/0008939 A1 | 1/2009 | Pare et al. |
| 2009/0072544 A1 * | 3/2009 | Pao ................................ 290/55 |
| 2009/0146435 A1 | 6/2009 | Freda |
| 2009/0191057 A1 * | 7/2009 | Knutson ........................ 416/23 |
| 2011/0156392 A1 * | 6/2011 | Thacker, II .................... 290/44 |

\* cited by examiner

TOROIDAL AUGMENTED WIND POWER GENERATION SYSTEM USING A MODIFIED AND INTEGRATED VERTICAL AXIS WIND TURBINE ROTOR AND GENERATOR ASSEMBLY

FIELD OF THE TECHNOLOGY

The present application relates generally to electrical power generation and, more specifically, to an apparatus and method for generating electrical power from wind.

BACKGROUND

The environmental costs of fossil fuels and the political instability of oil-producing regions have intensified efforts to develop alternative energy sources that are environmentally clean, more efficient, and more reliable. Wind-driven power generation systems are of particular interest in part because they are currently the one type of renewable power source that is closest to being economically competitive with traditional fossil fueled sources. Wind power may be converted to electrical power using a rotor assembly, either horizontally or vertically oriented to the flow of the ambient wind. The rotor blades of the rotor assembly convert the energy of the moving air into rotational motion on a drive shaft of the rotor assembly. An electrical generator coupled to the drive shaft then converts the rotational motion into electrical power.

Conventional wind-driven power generation systems suffer from many challenges. The term conventional is meant generally herein to describe a system that comprises a monopole tower with a single multi-bladed rotor spinning about an axis that is horizontal to the ambient flow of wind and is located at or near the top of the tower, i.e., a horizontal wind axis turbine or "HAWT" system. In general, wind power generators operate only when the wind blows, only within a certain range of wind velocities, and at a maximum power output level for an even smaller range of wind velocities. As a result, wind power generation has traditionally been expensive to produce and not reliably available. In response, conventional wind turbine manufacturers' assemblies have evolved towards very large rotor assemblies—with rotor diameters often equal to or greater than 90 meters—and very tall towers in order to gain economies of scale and to reach higher velocity and steadier winds that occur at higher altitudes.

However, increases in the sizes of conventional rotors have led to a number of additional problems. Large rotors are much more difficult to manufacture because the size of each blade reduces the ability for mass production and because the forces on the blade require special and expensive materials. Delivery of large rotors to the generation site is also a severe problem which often requires specialized trucking systems, assistance clearing crowded roadways, and wider/longer access ways near the wind farm which are often not feasible given the wind farm's remote location and position on hillsides. Maintenance is a challenge given the inability to quickly and easily access damaged components and the inability to deliver replacement components quickly. In addition, large rotors create greater torque and balance problems on the nacelle hub which therefore requires stronger gear box assemblies that often require exotic alloy compositions.

Another well-known problem of traditional turbines is the footprint such a technology requires. Wind rotors require smooth wind for maximum conversion efficiency. Turbulence from adjacent rotors forces towers to be spread across great distances to allow winds to recover optimal wind properties. The larger the rotors, the greater the turbulence, and the fewer the number of towers that can be placed on a given wind farm acreage. Additionally, operational efficiency is diminished due to the inability of such large rotors to effectively accommodate heterogeneous wind conditions at different altitudes across the rotor's face. In other words, it is difficult for a single large rotor to handle winds that come from different directions and/or at different speeds within the diameter of the single rotor.

Alternatively, an augmented wind power generation system uses a funneling apparatus, for example a fully or partially shrouded rotor, to increase the velocity of the ambient wind—based on the physics of the "Bernoulli Effect"—across the rotor blades. Because the electrical energy that is generated from a wind turbine is a cubic function of the speed of the wind, an augmented wind generation system holds the promise of producing an equivalent amount of electrical power from a much smaller rotor assembly. Funneling apparatuses may be vertically stacked into a tower with one or more rotor assemblies located within each apparatus. There are numerous types of wind amplification devices, but some are described in U.S. Pat. No. 4,156,579 (Weisbrich), U.S. Pat. No. 4,288,199 (Weisbrich), U.S. Pat. No. 4,332,518 (Weisbrich), U.S. Pat. No. 4,540,333 (Weisbrich), U.S. Pat. No. 5,520,505 (Weisbrich), and U.S. Pat. No. 7,679,207 (Cory). All six of the above patents are hereby incorporated by reference as if fully set forth herein.

Specific benefits of the exemplary embodiments are expanded upon later, but in general the use of smaller rotors to produce an equivalent amount of energy to larger rotors produces numerous advantages for augmented systems over conventional wind turbine systems. First, smaller turbines are easier to mass produce and easier to transport to the generation site. Second, smaller rotor diameters require a smaller diameter of wind flow to operate which reduces the inefficiencies of having heterogeneous wind conditions at different altitudes. Third, "cut in" speeds, the speed at which a turbine begins to generate electricity, are lower because the smaller blades are usually lighter and more able to operate in lower wind conditions. Fourth, the footprint of towers with smaller rotors is significantly improved because the size of the turbulence field is smaller, and towers can be placed much closer together. Fifth, the torque impact on the hub gears is significantly lessened thereby reducing the need for heavier engineering and exotic materials. And sixth, the smaller rotors spinning at higher speeds located next to a partial or full shroud provide the visual signals needed for birds to avoid the path of the rotor blades thereby reducing accidental bird kill often found with traditional tower systems.

However, not all augmented systems offer equal benefits. Some augmented systems are still not optimized to fully maximize wind amplification efficiently or to do so in an economically ideal manner. An illustrative example would include a recent system described in U.S. Pat. No. 7,679,209. This tower utilizes a single, cylindrical core to create marginal wind amplification and a series of cylindrical rotors on only two shafts adjacent to the one core to convert wind energy into electrical energy.

This configuration is not optimal for energy conversion in an economically attractive way for a variety of reasons. First, unlike a toroidal shaped tower the single cylindrical tower only deflects wind in one direction (laterally) thereby providing only marginal increases in wind speed. In other words, a much greater amount of wind is captured and funneled in a more efficient way in a toroidal tower leading to higher volumes of faster wind streams. Second, the cylindrical rotor assembly is only a small portion of the overall tower silhouette leading to unnecessary tower costs and additional loss of potential wind energy on a given wind farm. Third, the single open cylinder exposes key components to the elements leading to unnecessary and expensive maintenance costs. Fourth, the rotors are connected to only two rotating shafts meaning that there are relatively few (two) generators for the whole apparatus which thereby restricts the tower's generating capacity. Fifth, because there are only two vertical shafts for the entire tower it is unable to have rotors automatically face the direction of the wind flow at different altitudes which again reduces the tower's applicability in larger sizes as well as its economic efficiency. Although an interesting idea for enhancing ambient wind speeds, the systems described in U.S. Pat. No. 7,679,209 and others like it fail to effectively compete with conventional large scale rotor systems or with the embodiments described herein.

One system that has withstood the test of time because of the potential of its unique attributes is the toroidal shaped wind tower introduced in U.S. Pat. No. 4,156,579 (Weisbrich) and expanded upon in U.S. Pat. No. 5,520,505 (Weisbrich), and U.S. Pat. No. 7,679,207 (Cory). This configuration uses a series of vertically stackable, partially shrouded tower modules to direct wind over a pair rotor systems located within the hollows of each module.

There are numerous benefits of this configuration. First, substantial research of the toroidal shape has demonstrated the efficiency of this configuration due to a substantial increase in wind speed especially nearest the sides of the core tower. The unique shape allows for a large volume of wind to be funneled from three sides (top, bottom, and laterally), not just one, towards the rotors in the hollows of the tower. Second, the rotor pairs operate independently from rotors on other levels which allow each rotor pair to face directly into the wind at its particular altitude. Third, because each pair is independent from other pairs, the tower can produce a portion of its overall capacity when wind conditions and maintenance activities warrant. For example, if the wind is moving sufficiently fast to generate power at the level of the higher modules but not at the lower modules, the higher module rotors can still operate and produce electricity thereby increasing the tower's overall "capacity factor"—i.e., actual energy output per year compared to the potential maximum. Partial production is also a significant advantage to reduce maintenance costs because the tower can still produce some power while a subset of rotors is being fixed. A conventional wind rotor needs a sufficient average wind flow across its entire, large diameter area to generate any power at all leading to an all or nothing output of electricity. Partial production is an advantage for the toroidal tower configuration over traditional towers and over other amplified systems such as those found in U.S. Pat. No. 7,679,209. Fourth, the toroidal tower configuration is also scalable allowing the generation of power in the multi-megawatt scale. And fifth, the toroidal tower allows multiple rotors to be accessed and maintained on a single tower reducing maintenance costs for large scale towers. These benefits are in addition to the general advantages of augmented systems described above such as smaller footprint, lower cut in speeds, reduced gear box requirements, lower cost from mass production, and reduced bird kill.

Although the toroidal configuration has some clear advantages even over other augmented systems, its success in being effectively commercialized has been limited to date. A key factor constraining the adoption of the technology thus far has been the inability to manufacture a rotor and generator system to fully capitalize on the unique horizontal wind shear flow pattern purposefully created by the toroidal tower. As illustrated in FIG. 1, a horizontal wind shear exists due to the Bernoulli Effect wherein the speed of the wind nearest the shell of the toroidal tower is traveling faster than the wind located further away from the tower. In other words, the further from the tower the wind flow is located, the lower the amplification effect and therefore the lower the wind speed. To date, engineers have relied on using traditional HAWT rotors on toroidal towers, but these rotors are severely hampered by the strong horizontal wind shear environment. Specifically, the blades of the HAWT rotor travel perpendicularly through the horizontal wind shear such that the blade nearest the tower is receiving a much greater force of wind than those blades further from the tower. In addition, the outer tip of an individual blade is impacted much more severely by the wind shear than the portion of the blade nearer to the center axis. Both of these factors create differential torque on the individual blades and the overall rotor causing significant decreases in efficiency and increases in rotor malfunctions/failures.

The embodiments described herein provide a unique combination of adaptations to a traditional Vertical Axis Wind Turbine ("VAWT") and generator configuration that specifically accommodate and optimize the benefits of a multilevel toroidal tower towards the goal of cost effective, large scale power production.

VAWT systems are a type of wind turbine where the main rotor shaft is vertical instead of horizontal to the ambient flow of the wind. For illustration purposes, a traditional wind mill with three propeller blades connected to a generator behind the blades is a HAWT assembly while an anemometer that uses cupped paddles to measure wind speed is an example of a Savonius style VAWT assembly. Advantages of VAWT rotors over HAWT rotors tend to include omni-directional operation (can simultaneously accept wind from any direction), low noise, and excellent durability even in turbulent wind conditions. Traditional disadvantages of VAWT have included lower conversion efficiencies and a pulsatory torque that is produced during each revolution. Later approaches solved the torque issue by using a helical twist of the rotor blades. In addition, because VAWT rotors have traditionally been more difficult to mount on a monopole tower they are often installed nearer to a base or the ground which typically results in access to lower speeds and more turbulent winds.

A subset of the VAWT family of wind generators is the Savonius system. A Savonius VAWT system is a "drag" type of device with two (or more) scooped blades like those used in anemometers. Savonius VAWT wind rotors spin because there is a differential in pressure between the convex and concave side of the cupped blade. In a horizontal wind shear environment—such as that which is created in a toroidal wind tower—a VAWT rotor would benefit by the differential speeds of the funneled wind in that the faster winds near the tower would be hitting the concave or cupped portion of the blade while the slower winds away from the tower would provide relatively less resistance against the convex portion of the blade as it spun around its central axis. As a result, the VAWT rotor should be more efficient than normal in a horizontal wind shear environment and should, more importantly, avoid the challenges faced by a HAWT rotor which cuts perpendicularly through the wind shear turbulence.

In addition, a complementary component that should improve the efficiency, output, and cost of the proposed VAWT rotor is the recent commercialization of permanent magnet synchronous ("PMS") generators now being manufactured by multiple companies. These generators allow for a direct connection between a drive shaft and the generator such that complicated and costly gear boxes can be eliminated. In addition, the smaller sizes of PMS generators are particularly advantageous to the smaller rotors and higher rotation speeds of an augmented wind power generation system. Taken in concert with the potential benefits of using a continuous variable transmission ("CVT") drive, as described in U.S. Pat. No. 7,679,207 (Cory), the new PMS generators should help to significantly improve and extend the power curve of a rotor assembly in an augmented wind power generation tower although such benefits are not necessary for the benefits of the current patent to manifest.

Although a traditional VAWT rotor should be uniquely positioned to take advantage of a horizontal wind shear environment, the rotor blades and the integration of the rotor system with its associated generator and components must be significantly reconfigured to economically accommodate a large scale toroidal shaped wind tower and to enhance conversion efficiencies that have limited previous VAWT rotors. The focus of the embodiments disclosed herein is to present such a improvement.

SUMMARY

A wind power generating system is provided. The wind power generating system includes a plurality of stationary, vertically stacked wind amplification modules (that comprise the external shell of the tower) and may be shaped to accelerate wind passing between and/or around them. These modules may be connected to an internal core tower structure. A pair of integrated VAWT rotor/generator assemblies may be configured to accommodate the shape and wind dynamics (horizontal wind shear) of a toroidal amplification tower and may be positioned in a cavity of each module and may operate independently from generator assemblies located within different modules at different altitudes. The electrical generators may be capable of converting mechanical energy transferred by the rotor assembly into electrical energy. Each rotor/generator pair at a given level of the tower may freely rotate about the center core of the tower.

A method for generating power from wind may be used with a specially shaped, integrated VAWT rotor and generator assembly positioned within a cavity of a plurality of vertically stacked wind acceleration modules. The method includes the step of transmitting mechanical energy from a VAWT rotor assembly to an electrical generator located inside the diameter of the rotor blades that may be mounted to a yawable arm assembly that extends through a narrow gap between two of the modules. The method also includes the step of generating electrical energy with the electrical generator which is then transmitted through the center axis and frame of the yaw arm assembly to electrical equipment and connections inside the tower structure.

Before undertaking the detailed description below, it may be advantageous to set forth definitions of certain words and phrases used in connection to the disclosed exemplary embodiments: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout the present disclosure, those of ordinary skill in the art should understand that in many, if not most instances, such definitions apply to prior, as well as future uses of such defined words and phrases.

BRIEF DESCRIPTION OF THE DRAWINGS

For a more complete understanding of the present embodiments and their advantages, reference is now made to the following description taken in conjunction with the accompanying drawings, in which like reference numerals represent like parts.

DETAILED DESCRIPTION OF THE EMBODIMENTS

FIGS. 1 through 9, discussed below, and the various descriptions of the embodiments disclosed herein are by way of illustration only and should not be construed as limiting. Those skilled in the art will understand that the principles of the present disclosure may be implemented in suitably arranged augmented wind power generation system.

Figure 1:
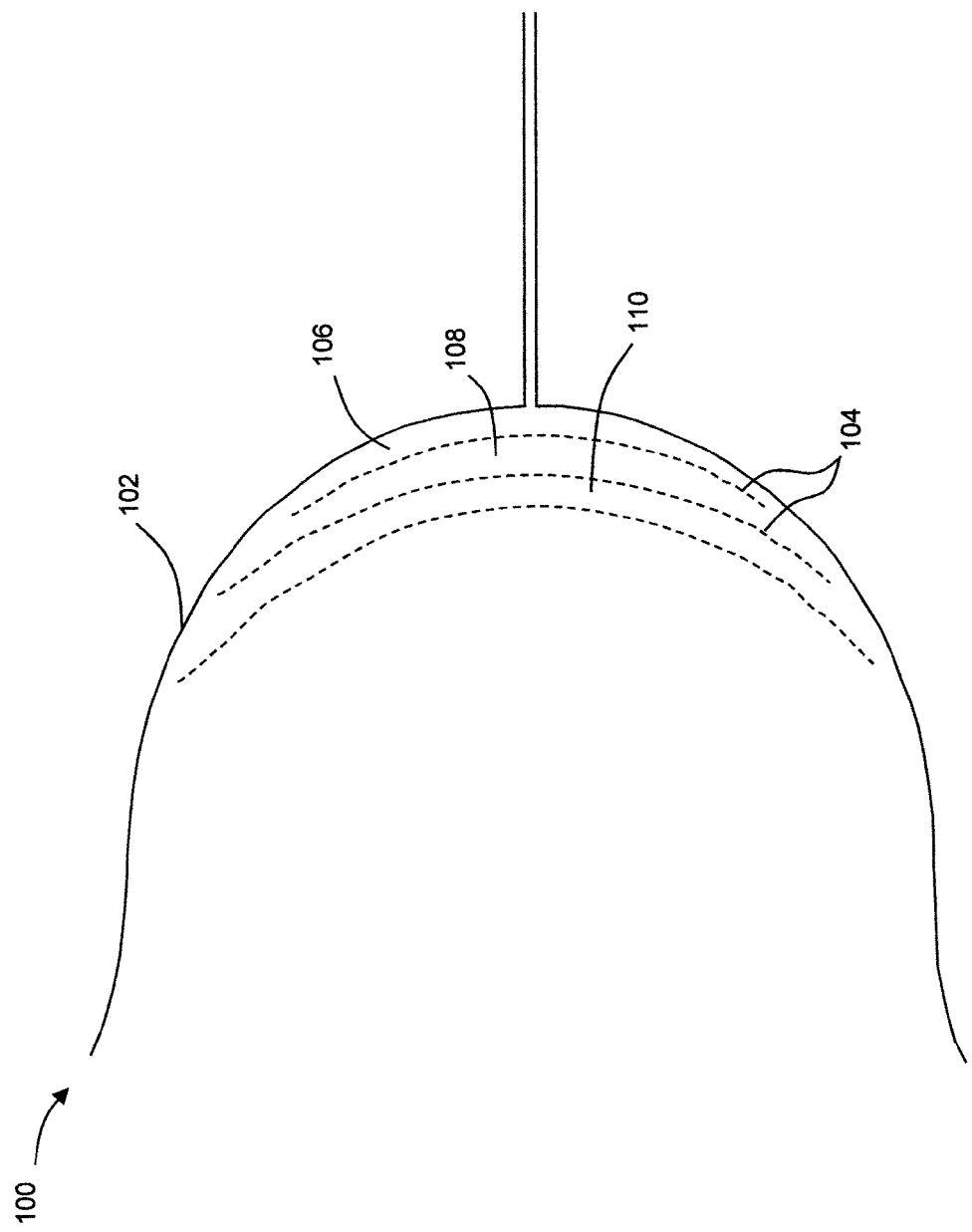
FIG. 1 illustrates a typical wind shear environment caused by the amplification of ambient wind around a toroidal shaped augmented wind power generation system in accordance with one of more of the exemplary embodiments.

FIG. 1 depicts a typical horizontal wind shear environment 100 created by an augmented wind power system. The fastest winds may be located nearest to the tower surface 102. The further one moves away from the tower surface 102, the lower the wind amplification. In FIG. 1, wind flow patterns 104 exist in close proximity to tower surface 102. Previous research suggests that within the current tower design, in region 106, wind flow is approximately two times faster than the ambient wind speed. In region 108, wind flow is approximately 1.95 times faster than the ambient wind speed. In region 110, wind speed is approximately 1.9 times faster than the ambient wind speed. As a result, to extract the greatest energy from the amplified wind stream, one embodiment of a wind power generating system may include a VAWT rotor that may move in the substantial same direction as the wind flow, instead of perpendicular to it as is the case when using a HAWT rotor assembly. In addition, an embodiment may include blades of the VAWT rotors shaped to conform to the curvilinear shape or profile of the tower wall to access the fastest wind speeds near the tower.

Figure 2:
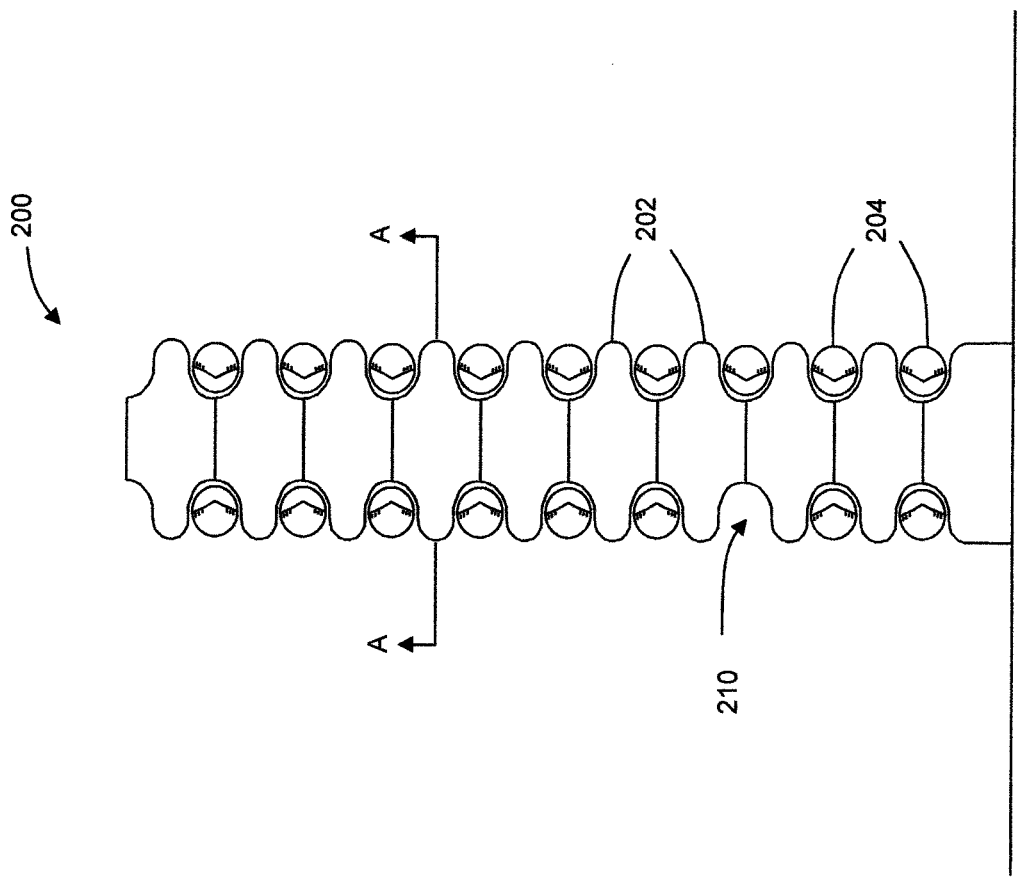
FIG. 2 depicts a toroidal augmented wind power generation system in accordance with one or more of the exemplary embodiments.
Figure 9:
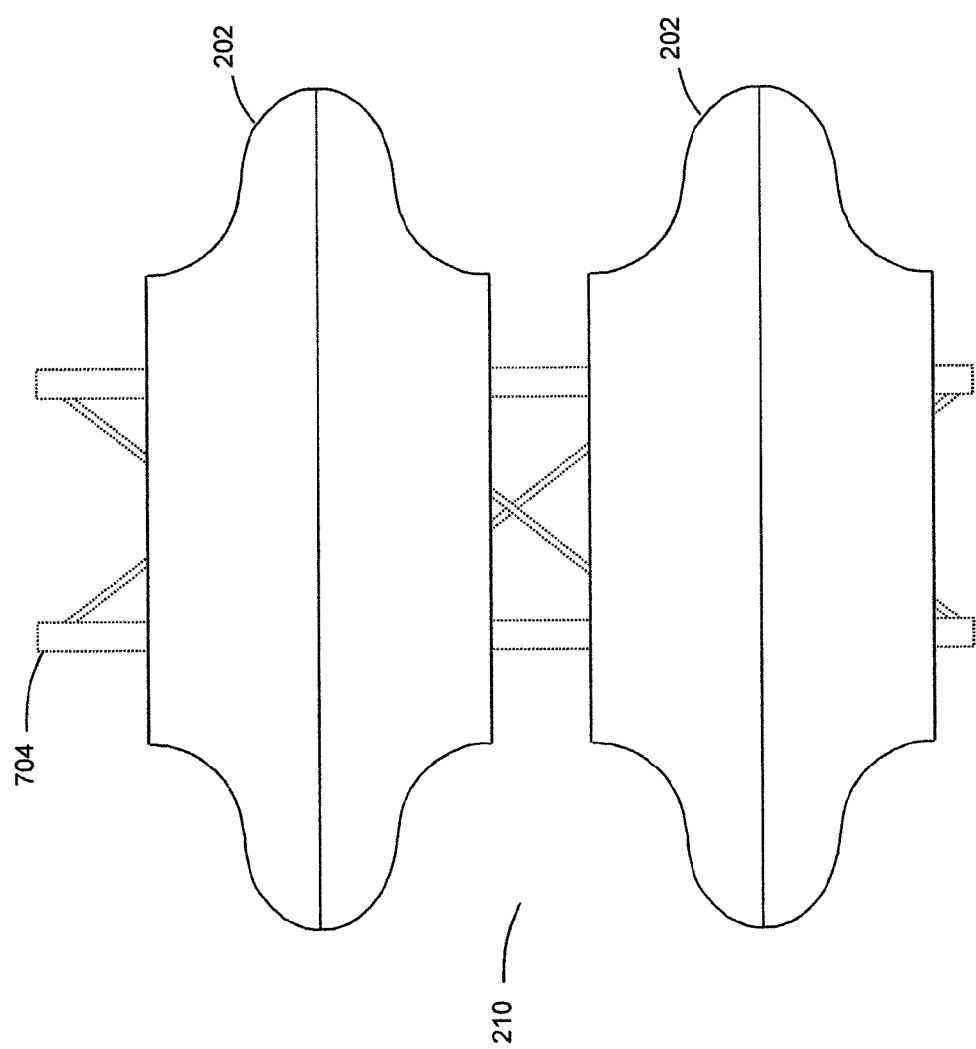
FIG. 9 depicts a side view of components of the wind tower in accordance with one or more of the embodiments.

FIG. 2 illustrates an augmented wind power generation system 200 according to an embodiment of the present wind power generation system. The system 200 may include an internal central tower (not shown in FIG. 2) and a plurality of stationary vertically stacked wind acceleration modules 202. The modules 202 may be shaped to create a plurality of substantial semi-toroidal cavities around the tower. That is, the modules may be substantially circularly symmetrical about a vertical axis, having an outer surface contour as shown in FIG. 2 and FIG. 9.

The shape of modules 202 may have the effect of increasing the velocity of wind flowing around the tower through the cavities/channels 210 between the modules 202. Rotor assemblies 204 may be located in the exterior cavities 210 between two of the modules 202 to convert the kinetic energy of wind flowing through the cavities 210 into rotational energy of the rotor assemblies 204. In FIG. 2, a rotor assembly 202 that would occupy cavity/channel 210 has been omitted for clarity.

Typically, pairs of the rotor assemblies 204 may be located in the cavities 210 on opposing sides of the system 200, in order to convert the energy of the wind flowing around both sides of the system 200 into rotational energy. Furthermore, the pairs of rotor assemblies 204 may be rotationally mounted on a yawable platform around the central tower to permit the rotor assemblies 204 to automatically and simultaneously adapt to changes in wind direction by rotating around the system 200 to face substantially directly into the wind. The rotation of a pair of rotor assemblies 204 in one semi-toroidal cavity may be independent of the rotation of a pair of the rotor assemblies 204 in another of the semi-toroidal cavities, enabling the system 200 to adapt to wind from differing directions at different altitudes of the system 200. The overall height of system 200 may be measured in hundreds of feet and wind direction may be substantially different at ground level than at higher elevations.

Figure 3:
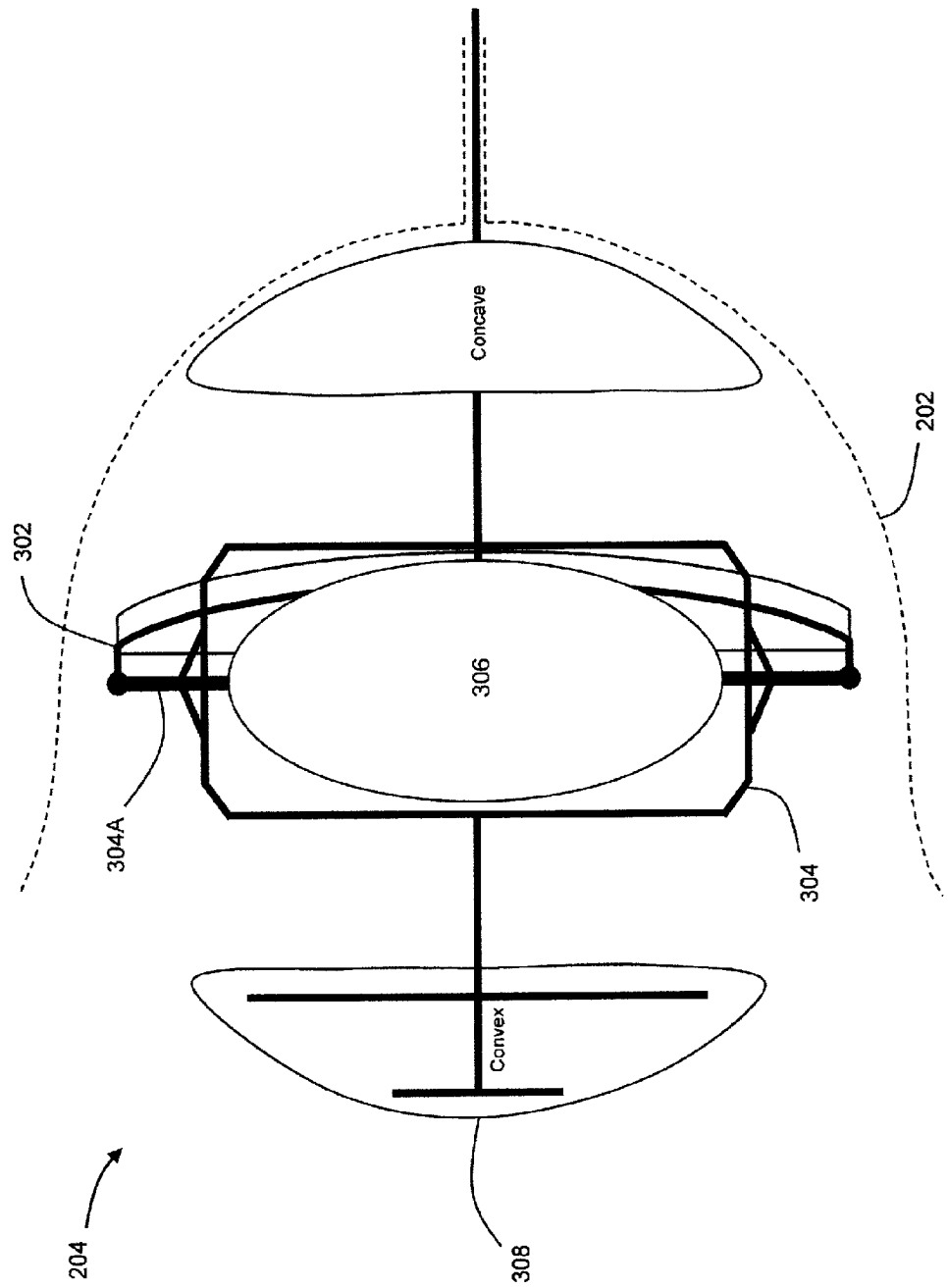
FIG. 3 depicts an integrated VAWT rotor and generator assemblies in accordance with one or more of the exemplary embodiments.
Figure 3A:
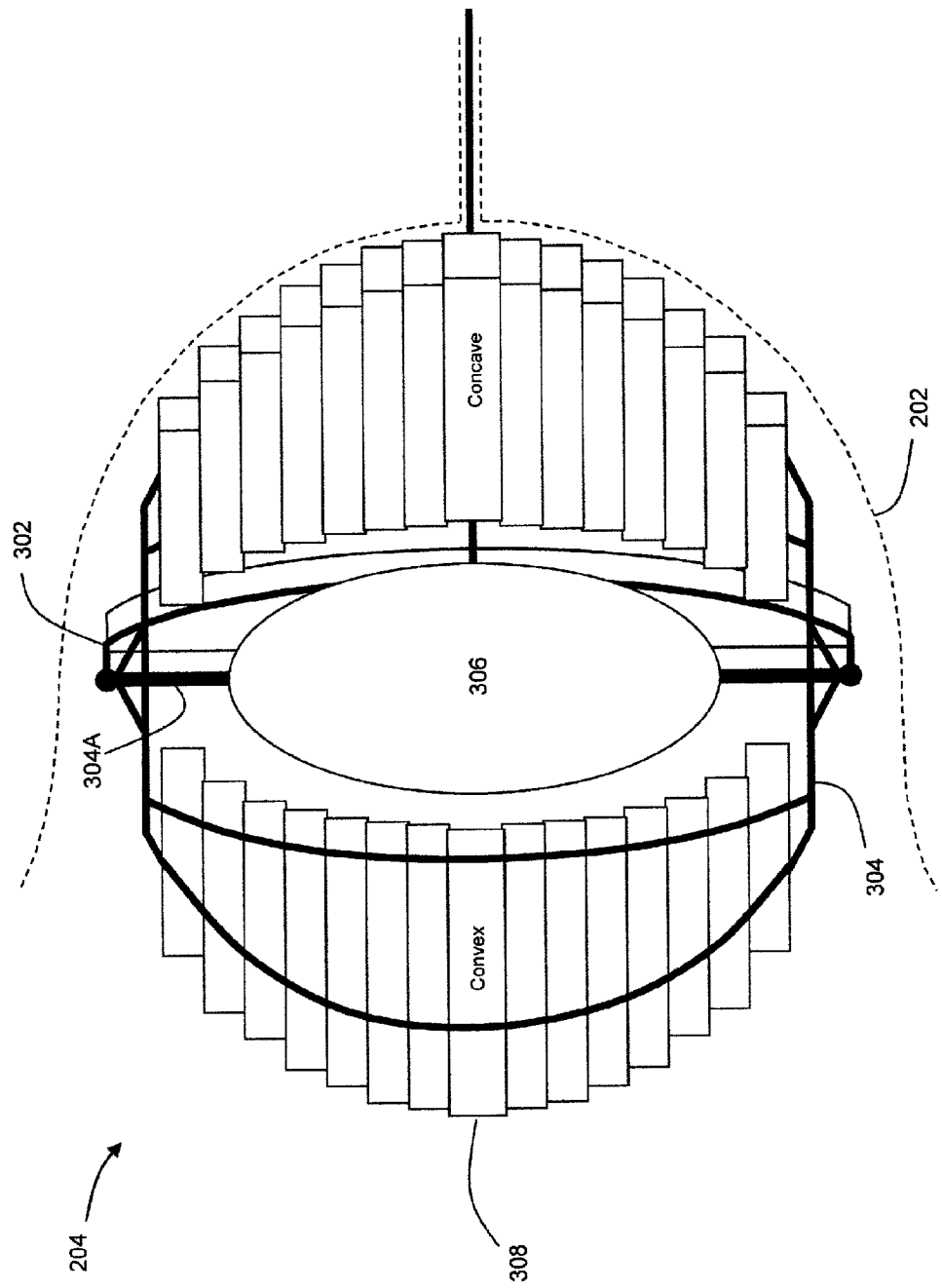
FIG. 3A depicts an integrated VAWT rotor and generator assemblies in accordance with one or more of the exemplary embodiments.

FIG. 3 illustrates in more detail an embodiment of a Savonius VAWT rotor and support assembly 204 that may have a modified "spherical" shape that conforms to the curved wall of the external shell of the tower. The term spherical may be used because the rotor may define the shape of a sphere when rotating as opposed to traditional VAWT rotors that have the shape of a cylinder when rotating. The dotted line 202 represents the outer shell of the stationary modules 202. The VAWT rotor assembly may be held in position at both the top and bottom of its center axis by a substantial "Y" shaped rotatable yaw arm 302 that may extend through a gap between two of the stationary tower modules 202 and may connect at both the top and bottom of the rotor assembly axis and to the yawable platform around the central core of the tower. A frame of support bars 304 may extend from the top and bottom of the yaw arm to hold the rotor blades in place (shown in more detail in FIG. 5). In the middle of the rotor assembly, along the center axis 304a, a nacelle 306 may hold the generator and, if needed, the continuous variable transmission ("CVT"), tachometer, and CVT controller (shown in more detail in FIG. 5). In FIG. 3, each blade in the rotor assembly is depicted as being comprised of a single piece of convex/concave shaped material. However, other forms of blades such as a multi-blade configuration 308 depicted in FIG. 3A may also be used having the outer edge of the combined set of blades being substantially shaped to conform to the toroidal contours of the tower module's wall. As the wind strikes the tower and is directed around the sides of the tower, the strongest winds, which are nearest the tower, may strike the concave ends of the VAWT blades and spin the rotor assembly about its vertical axis to create a spinning energy. The spinning energy may be converted to electrical energy by the generator, and the electrical energy may be directed through the top of the yaw arm back into the internal portion of the tower.

Figure 3B:
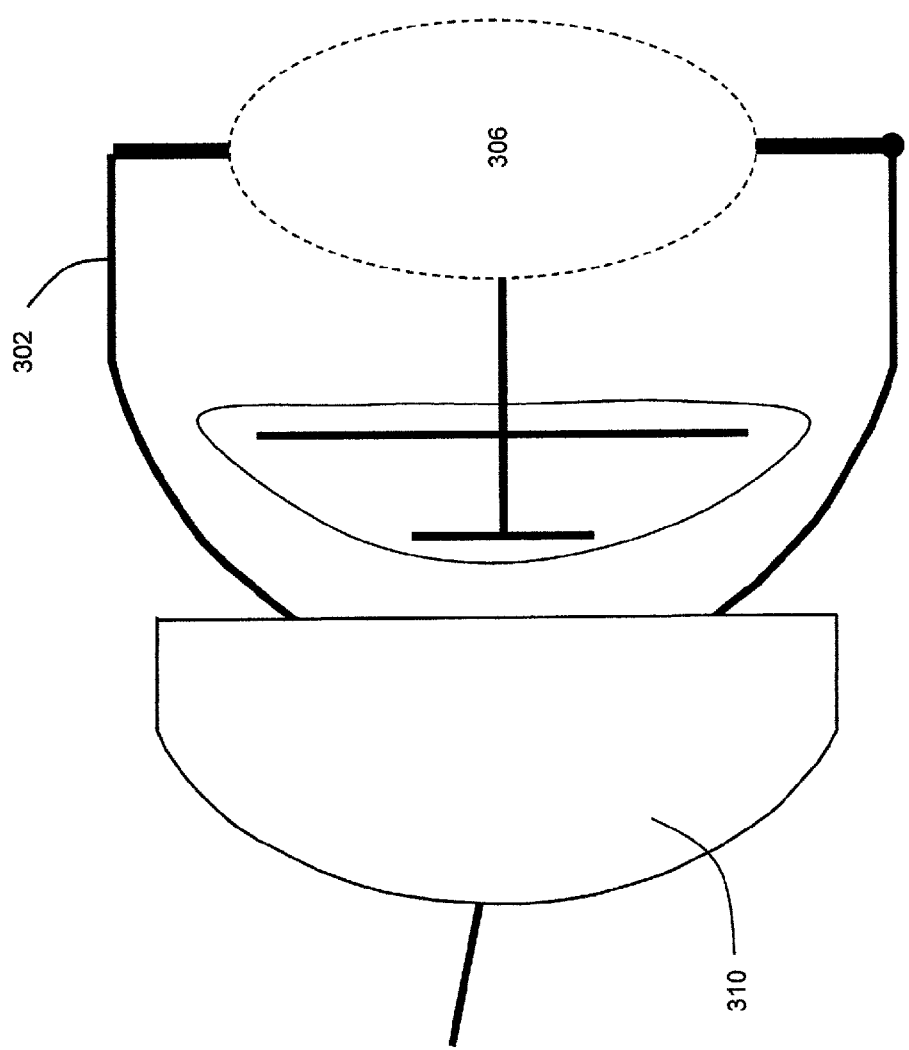
FIG. 3B depicts a side view of selected aspects of an integrated rotor and generator assembly in accordance with one or more exemplary embodiments.

FIG. 3B highlights a location and structure for a tailfin 310 attached to the yawable support arm employed in one embodiment of the present wind power generating system. The tailfin 310 may be shaped as a reversed 'D' and mounted on the yaw arm 302.

Figure 4:
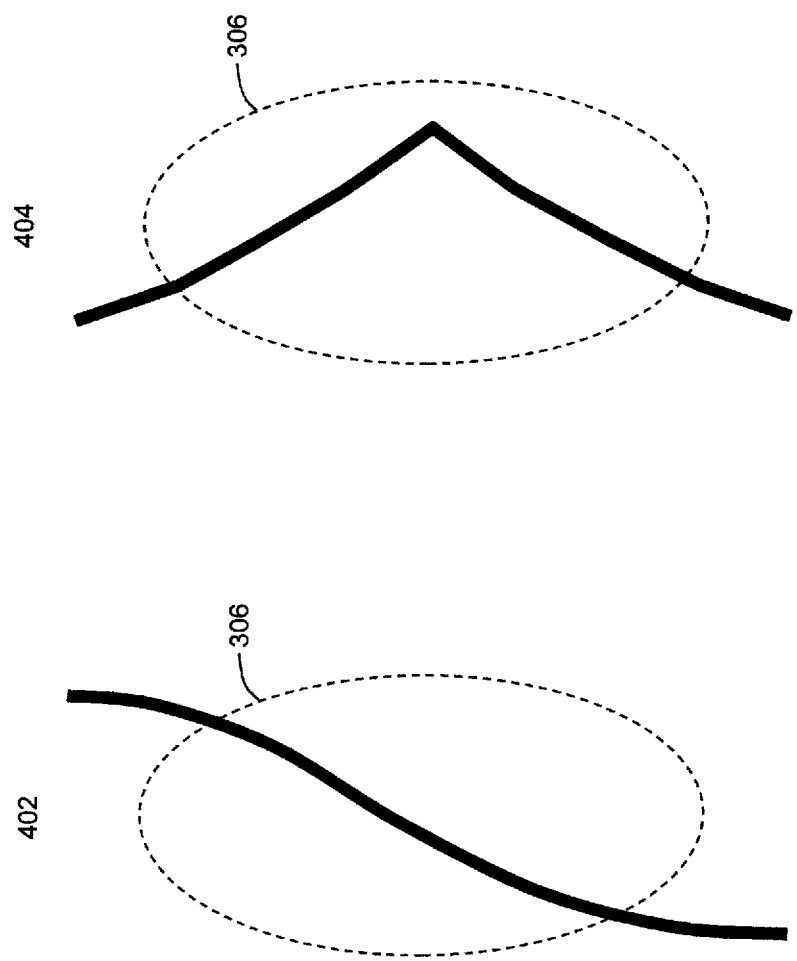
FIG. 4 depicts side views of rotor blades in accordance with one or more of the exemplary embodiments.

FIG. 4 shows lateral views of two alternative configurations of the rotor blades. The dotted line represents the nacelle 306 that may remain stationary inside the spinning rotor assembly. These two configurations, the helix 402 and the delta wing 404, could be used with the spherical VAWT assembly if necessary to help eliminate pulsatory torque concerns found with early VAWT rotors. These two rotor arrangements are illustrative and are not meant to limit the number and/or types of configurations that would accommodate the principles of the present wind power generating system.

Figure 5:
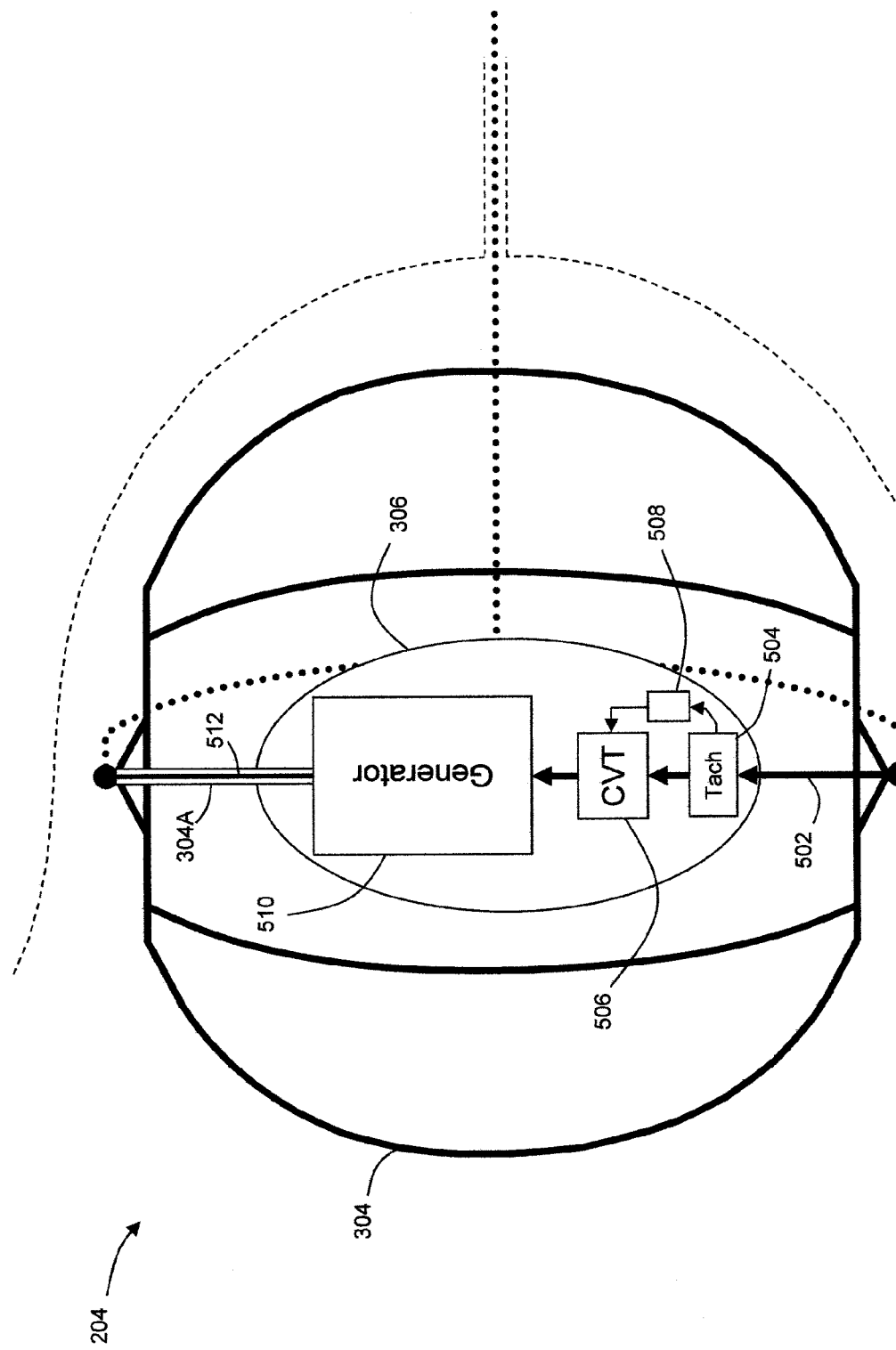
FIG. 5 is a detailed depiction of an integrated rotor assembly in accordance with one or more of the exemplary embodiments.

FIG. 5 is an illustration of an embodiment of rotor assembly 204 including a supportive frame assembly 304 and nacelle 306. The frame may provide support to the rotor blades while allowing for space near the central axis for the nacelle 306. In this diagram, the frame may be connected to a drive shaft 502 at the bottom of the frame where the rotational energy may be transmitted into the nacelle 306 and either through a tachometer 504 into a variable speed drive such as a continuous variable transmission CVT 506 which is controlled by a CVT controller 508 or directly to the electrical generator 510. Electrical energy may be then transmitted through an electrical wire 512 through a hollow tube in the top of the center axis of the frame 304a and back into the interior of the tower.

Figure 6:
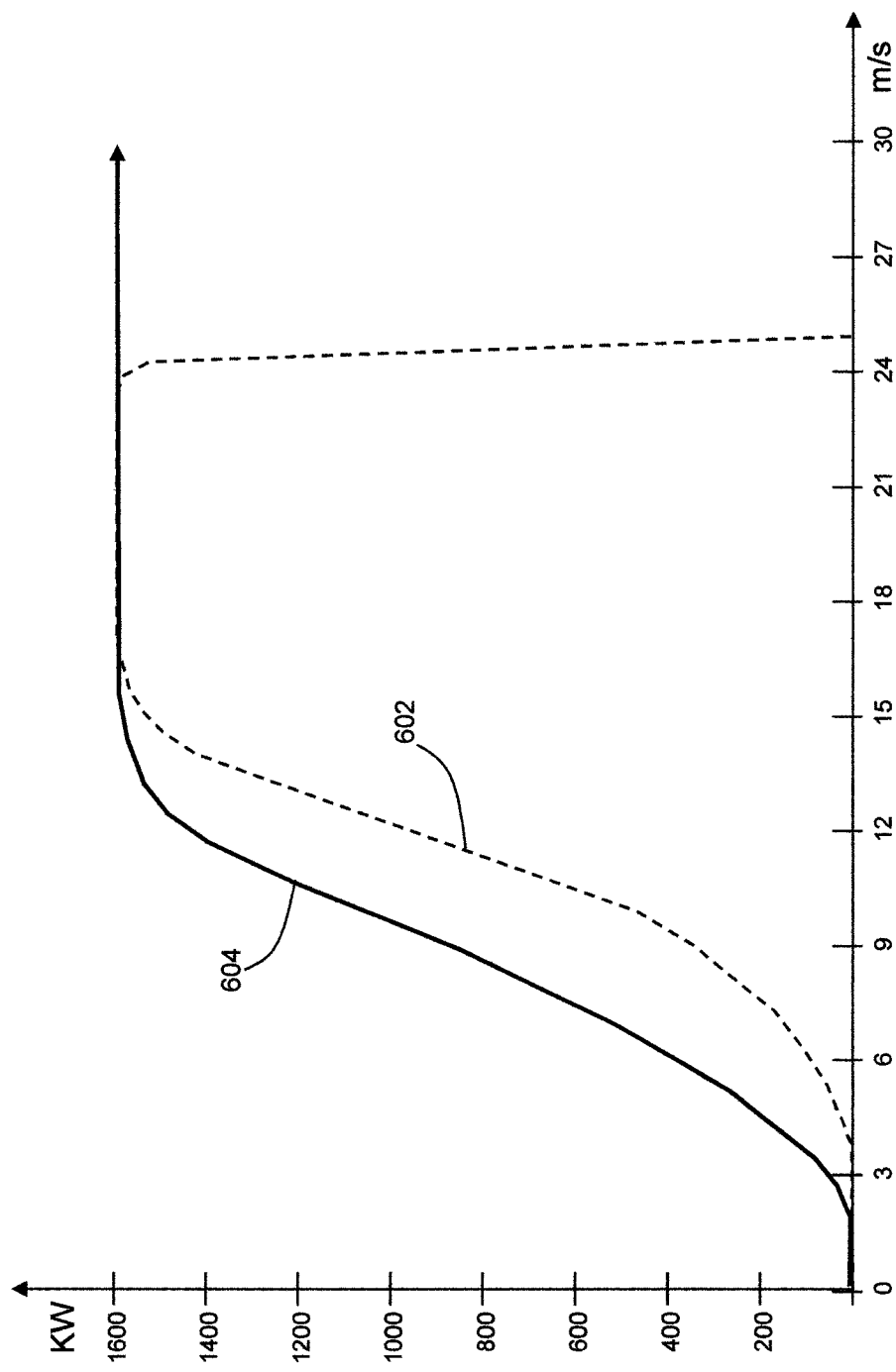
FIG. 6 depicts power curves of a conventional wind power generation system and a wind power generation system in accordance with one or more of the exemplary embodiments.

FIG. 6 presents illustrative power curves of a traditional wind power generation system and an embodiment of a toroidal augmented wind power generation system. Ambient wind speed in meters per second is plotted along the horizontal axis and generated electrical power in kilowatts along the vertical axis.

An exemplary power curve for a traditional wind tower is shown by dashed line 602. For wind speeds below a so-called "cut-in" or threshold wind speed of about 4 meters per second (m/s), the depicted system generates no electrical power in a traditional wind system. For wind speeds between about 4 m/s and 15 m/s, an amount of electrical power proportional to the wind speed is generated. For wind speeds between about 15 m/s to 25 m/s the amount of power generated is substantially constant. The depicted system has a predetermined "cut-out" wind speed of substantially 25 m/s. Allowing a system to operate in winds above its cut-out speed may damage system components, so a system is typically braked or its rotor blades turned edge-on to the wind to minimize torque on the system.

In contrast, an augmented wind power generation system according to one embodiment, such as that shown in FIGS. 2 through 5, produces electrical power over a greater range of wind speeds, as may be seen in solid line 604. In particular, the augmented system may employ smaller, lighter blades which allow for lower cut in speeds. Also, the amplification of ambient wind speed before hitting the rotors effectively lowers the relative ambient cut in speed even further and provides an additional increase in the number of hours during the year that an augmented wind system can operate.

Furthermore, the CVT 506 may adjust or be adjusted to permit the electrical generator 510 to operate at or near an optimal rotational velocity for a broader range of wind speeds than a traditional wind tower or conventional augmented wind power generation system. As described above, one embodiment of the system may begin generating power at a lower cut-in wind speed. For wind speeds from the cut-in velocity to a cutout velocity (not shown in FIG. 6) the effective gear ratio of the CVT 506 may be adjusted to generate a constant level of electrical power.

A traditional wind tower or conventional augmented wind power generation system has a fixed ratio gear box configured to allow an electrical generator to operate in an optimal range of rotational speeds when wind speed is in a range typical for the site at which the system is installed. Such a gear box typically provides a step up in speed from the rotational velocity of the rotor assembly to that of the electrical generator, regardless of the wind speed. This configuration results in the electrical generator being 'over rotated' with wind speeds above a predetermined level which determines the cut-out speed of such a traditional system.

In contrast, the CVT 506 may provide a step up in rotational velocity at lower wind speeds and a step down at higher wind speeds, allowing the electrical generator 510 to operate over a broader range of wind speeds. As described with regard to FIG. 6, however, an upper limit of wind speed may still exist for an augmented wind power generation system above which such a system should not be operated.

The role and configurations of a CVT in a toroidal wind amplification power system are documented in detail in U.S. Pat. No. 7,679,207 (Cory) (Incorporated by reference in its entirety). However, because of advances in permanent magnet generators which are inherently variable speed, the need for a CVT may come into play more to step down the revolutions of the generator in high wind speed environments thereby delaying rotor shut down. If extremely high wind environments are not present at the location of a wind tower, then it may be possible to connect directly to the generator. Permanent magnet generators may be now commonly manufactured in the 20 kilowatt to 100 kilowatt ranges which may be suited for use within the wind system described herein.

Figure 7:
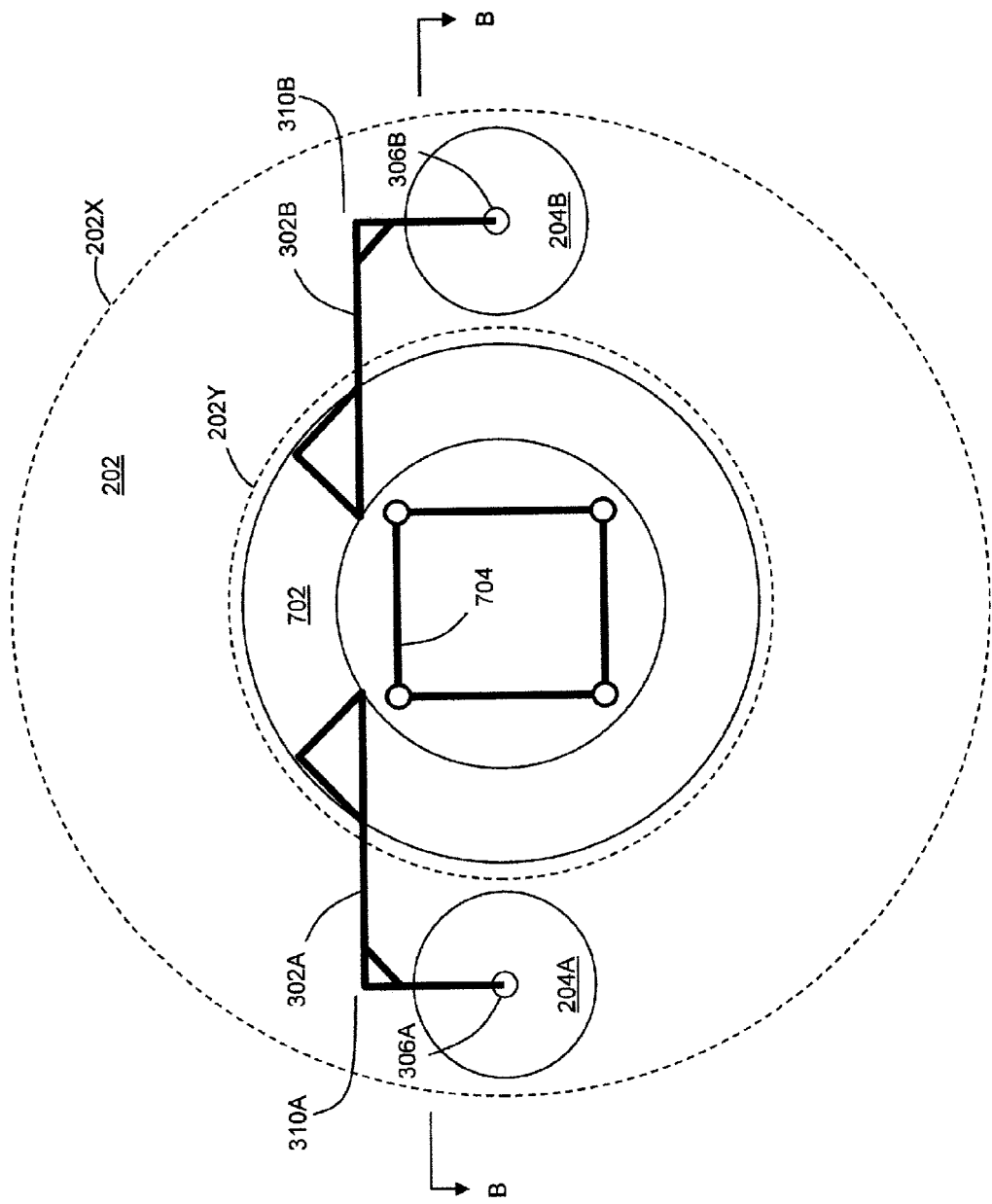
FIG. 7 depicts a top view of rotor, generator, and yaw arm assemblies in accordance with one or more of the exemplary embodiments.

FIG. 7 presents a sectional view taken along line A-A in FIG. 2. The wind acceleration modules 202 may be mounted to a central tower 704. Dashed line 202X indicates an outermost extent of the contour of the module 202 and dashed line 202Y indicates an innermost extent of the semi-toroidal cavity of the module 202. The rotor assemblies 204A and 204B may be located within the semi-toroidal cavity 210 of the module 202, as described with regard to FIG. 2.

Rotor assemblies 204A and 204B of FIG. 7 may be mounted on a platform 702, which may be rotatably mounted to the central tower 704. The yaw arms 302A and 302B may extend through one or more horizontal gaps between adjacent wind acceleration modules 202.

Because the platform 702 may rotate about the central tower 704, when the direction of the wind changes, the platform 702 may be repositioned with the cooperation of the tailfins 310A and 310B if necessary so that each set of the individual rotor assemblies 204A and 204B face substantially directly into the wind. In this new position, the electrical generators inside their respective nacelles 306A and 306B may generate more electrical power than in a previous position. This repositioning of the rotor assemblies towards the direction of the wind may occur independently at each level of the overall generation system 200.

Figure 8:
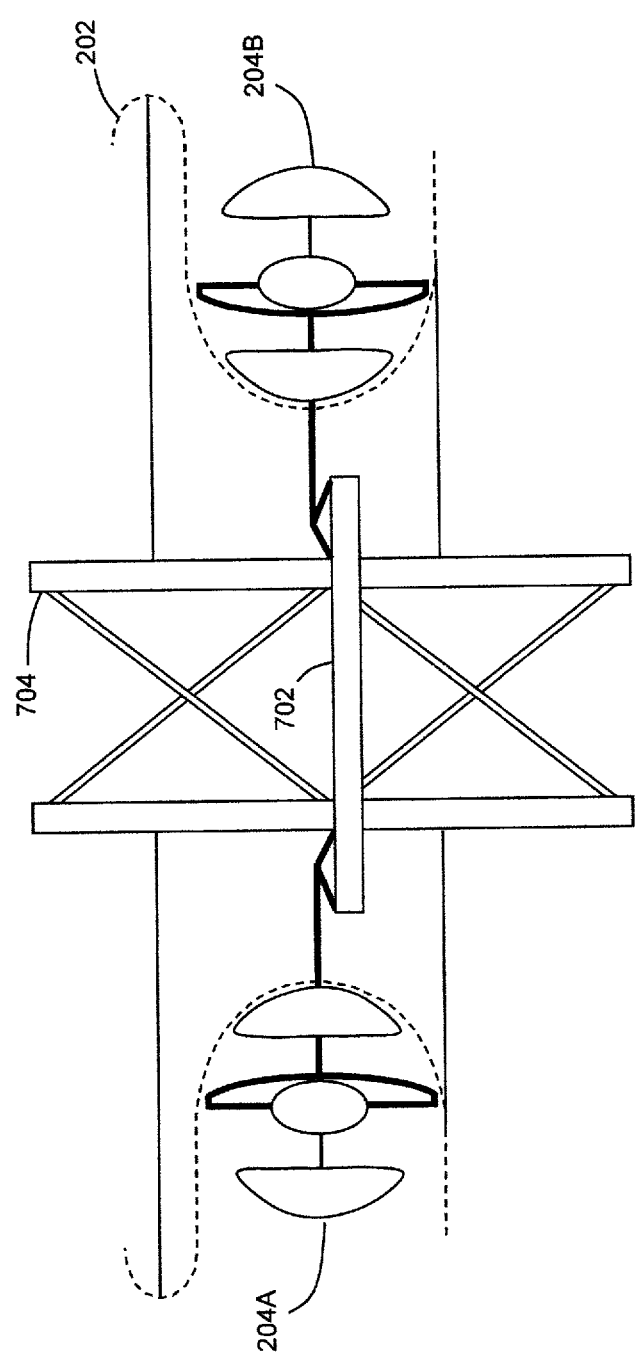
FIG. 8 depicts a side view of the rotor, generator, and yaw arm assemblies in accordance with one or more of the exemplary embodiments.

FIG. 8 depicts a sectional view taken along line B-B in FIG. 7. The contour of the wind acceleration module 202 is depicted with dashed lines. The module 202 may be mounted to the central tower 704 by multiple struts (not depicted in FIG. 8). A second module 202 may be mounted to the central tower 704 below the first module 202, shown in FIG. 8, such that the upper portion of the second module 202 and the lower portion of the first module 202 mate to produce a nearly unbroken (nearly continuous) surface.

FIG. 9 illustrates two stationary modules 202. The internal core tower 704 may be constructed first allowing for modules 202 and yawable rotor assemblies 204 to be attached and raised up the tower in sequential order thereby increasing construction efficiency. The cavity or channel 210 formed between a first module 202 and a second module 202 is also shown in FIG. 9.

Although the present disclosure has been described by various embodiments, various changes and modifications are also contemplated. For example, in another embodiment, an augmented wind power generation system may have a different wind funneling apparatus than that shown in FIG. 2. In another embodiment, other forms of VAWT rotors such as a Darrieus rotor may be used. It is intended that the present disclosure encompass such changes and modifications as fall within the scope of the appended claims.

What is claimed is:

1. A wind power generating system, comprising:
   a plurality of vertical axis wind turbine rotor assemblies;
   a plurality of vertically stacked toroidal modules; and
   a substantially y-shaped yawable support arm having a first end connected to an upper end of the at least one of the plurality of vertical axis wind turbine rotor assemblies and a second end connected to a lower end of the at least one of the plurality of the vertical axis wind turbine rotor assemblies,
   wherein at least one of the plurality of vertical axis wind turbine rotor assemblies is located in a cavity formed between an upper section of one of the plurality of vertically stacked toroidal modules and a lower section of another of the plurality of vertically stacked toroidal modules.

2. The wind power generating system of claim 1, further comprising a generator assembly located within a spherical trajectory about each of the plurality of vertical axis wind turbine rotor assemblies.

3. The wind power generating system of claim 2, further comprising:
   a continuously variable transmission coupled to the at least one of the plurality of vertical axis wind turbine rotor assemblies;
   a sensor coupled to at least one of the plurality of vertical axis wind turbine rotor assemblies; and
   a controller electrically coupled to the sensor and to the continuously variable transmission, wherein the generator assembly is mechanically coupled to the continuously variable transmission.

4. The wind power generating system of claim 1, further comprising a rotor blade within each of the plurality of vertical axis wind turbine rotor assemblies,
   wherein the rotor blade has an edge substantially conforming to a curvilinear contour of the cavity.

5. The wind power generating system of claim 1, further comprising:

a tower, and a first platform rotatably mounted on the tower between a stationary upper section of one of the plurality of vertically stacked toroidal modules and a stationary lower section of another of the plurality of vertically stacked toroidal modules, wherein the at least one of the plurality of vertical axis wind turbine rotor assemblies and generator assembly are mounted on the first platform, and wherein the at least one of the plurality of vertical axis wind turbine rotors is coupled to the first platform and rotates along a circular path concentric with an axis of symmetry of a corresponding plurality of vertically stacked toroidal modules, wherein the substantially y-shaped yawable support arm is mounted between the stationary upper section of one of the plurality of vertically stacked toroidal modules and a stationary lower section of another of the plurality of vertically stacked toroidal modules.

6. The wind power generating system of claim 5, further comprising at least a second vertical axis wind turbine rotor assembly and generator assembly.

7. The wind power generating system of claim 6, wherein the first platform and the at least one of the plurality of vertical axis wind turbine rotor assemblies and generator assembly rotate independently of a second platform located above or below the first platform.

8. The wind power generating system of claim 1, further comprising:
a tailfin attached to the substantially y-shaped yawable support arm.

9. A method for generating electrical power from wind, comprising the steps of:
transmitting mechanical energy from a vertical axis wind turbine rotor assembly mounted between stationary vertically stacked wind acceleration modules to an electrical generator; and
transmitting electrical energy output from the electrical generator through a wire along a y-shaped yawable support arm mounted between the stationary vertically stacked wind acceleration modules into an interior core of the acceleration module tower.

10. The method of claim 9, further comprising:
moving the vertical axis wind turbine rotor assembly and electrical generator between two of the stationary vertically stacked wind acceleration modules along a circular path concentric with an axis of symmetry of the module,
wherein the vertically stacked wind acceleration modules are substantially circularly symmetrical about a vertical axis.

11. The method of claim 10, further comprising preventing transmission of mechanical energy from the vertical axis wind turbine rotor assembly to the electrical generator according to a sensed rotational speed.

12. The method of claim 9, further comprising:
sensing a rotational speed of the transmission input and a transmission output;
varying a ratio of the rotational speed of a transmission input to the rotational speed of a transmission output over a continuous range of values;
determining a range of rotational velocities; and
controlling a continuously variable transmission such that the electrical generator operates within the range of rotational velocities, the range of rotational velocities being based upon a signal received from a sensor.

13. A wind turbine rotor apparatus, comprising:
a first vertical axis wind turbine rotor assembly;
a plurality of blades within the first vertical axis wind turbine rotor assembly shaped to substantially conform to a contour of a wind acceleration module;
a generator assembly located within a spherical trajectory of the first vertical axis wind turbine rotor blades; and
a frame assembly, including a y-shaped yawable support arm, extending radially from an interior tower core.

14. The wind turbine rotor apparatus of claim 13, wherein the y-shaped yawable support arm is connected to a top end of and the first vertical axis wind turbine rotor assembly and a bottom end of the first vertical axis wind turbine rotor assembly.

15. The wind turbine rotor apparatus of claim 14, further comprising a wire associated with the y-shaped yawable support arm through which electrical energy output from the generator assembly is transmitted into the interior tower core.

16. The wind turbine rotor apparatus of claim 13, further comprising a tailfin attached to the y-shaped yawable support arm.

17. The wind turbine rotor apparatus of claim 13, further comprising a second vertical axis wind turbine rotor assembly and a second generator assembly.

18. The wind turbine rotor apparatus of claim 17, wherein the first vertical axis wind turbine rotor assembly and generator assembly and second vertical axis wind turbine rotor assembly and second generator assembly are simultaneously capable of moving from a first position to a second position.

19. The wind turbine rotor apparatus of claim 17, further comprising a first rotatable platform upon which the first vertical axis wind turbine rotor assembly and the second vertical axis wind turbine rotor assembly are mounted to operate independently from a third vertical axis wind turbine rotor assembly mounted on a second rotatable platform located above or below the first rotatable platform.

20. The wind turbine rotor apparatus of claim 13, further comprising:
a continuously variable transmission mechanically coupled to the first vertical axis wind turbine rotor assembly;
an electrical generator mechanically coupled to one of the continuously variable transmission and the first vertical axis wind turbine rotor assembly;
a sensor coupled to the first vertical axis wind turbine rotor assembly; and
a controller electrically coupled to the sensor and to the continuously variable transmission, wherein the electrical generator is mechanically coupled to the continuously variable transmission,
wherein the electrical generator is configured to convert mechanical energy transferred by one of the continuously variable transmission or the first vertical axis wind turbine rotor assembly into electrical energy.

* * * * *